April 23, 1968 P. R. STAPLES 3,379,189
FORCED CONVECTION OVEN
Filed Aug. 8, 1966
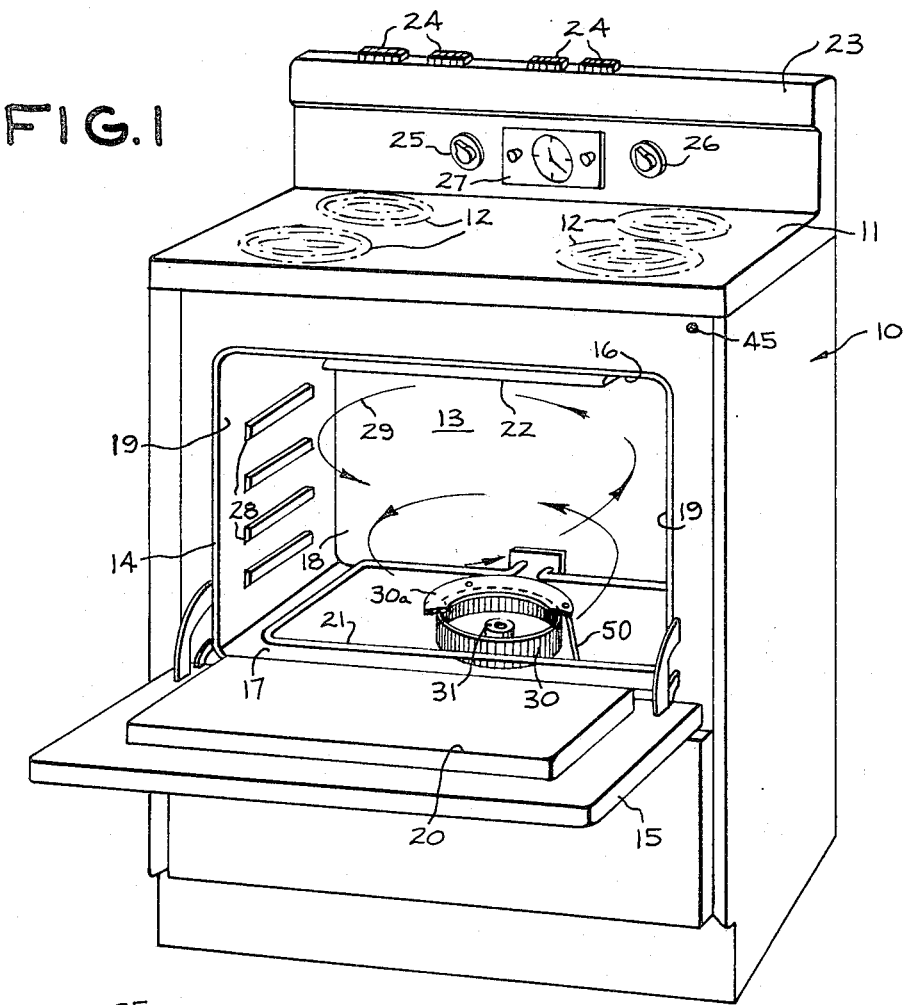
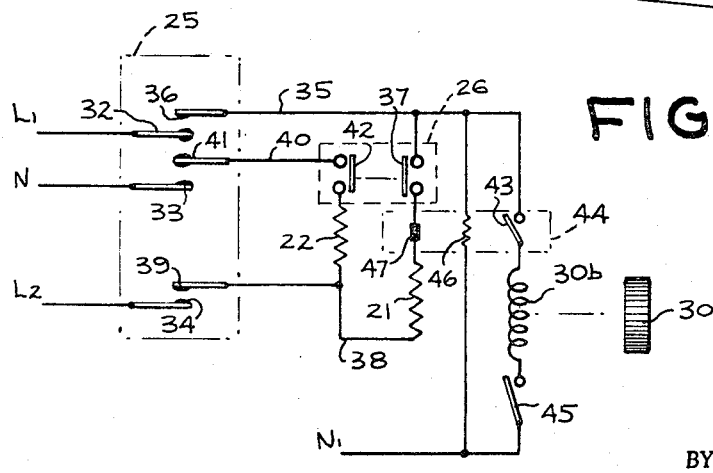
INVENTOR.
PAUL R. STAPLES
BY Radford M. Reams
HIS ATTORNEY 3,379,189
FORCED CONVECTION OVEN
Paul R. Staples, Louisville, Ky., assignor to General
Electric Company, a corporation of New York
Filed Aug. 8, 1966, Ser. No. 571,082
3 Claims. (Cl. 126—21)

ABSTRACT OF THE DISCLOSURE

A forced convection baking oven having an air handling means that is located within the oven cavity and preferably raised slightly above the bottom wall thereof. The air handling means is a powered device that has a vertical, axial air intake and a horizontal, radial air outlet for creating an unstable vortex air flow that wanders in a random pattern throughout the cooking cavity to increase the heat transfer capability of the oven.

---

This invention relates to a food preparation oven and more particularly to an improved oven of the forced convection type for obtaining uniform and rapid heating of food.

It has been recognized for some time that improved cooking, particularly baking and roasting, should result from circulating air through the oven enclosure during periods of operation. However, no prior art oven has achieved optimum results because no one prior to applicant has recognized the true solution to the problem. Prior art devices have circulated currents of air through ovens, increasing the flow or changing the pattern of flow in attempts to eliminate uneven cooking of the food, all without complete success. Applicant has found by creating an unstable vortex flow of air within the oven cavity that greatly improved performance will be obtained. Applicant has further found for bakery type goods having leavening agents that optimum results will be obtained by delaying the use of the vortex air current for a predetermined period after the heating means for the oven is activated.

It is an object of this invention to provide an improved food preparation oven of the forced convection type.

It is another, more specific, object of this invention to provide such an improved oven with blower means for creating an unstable vortex air flow within the oven.

It is a further object of this invention to provide such an improved oven with control means effective to delay activation of the blower means for a pre-determined period after activation of the heating means of the oven.

The present invention, in accordance with one form thereof, is embodied in a food preparation oven including an enclosure adapted to receive food to be heated, and heating means for heating food in the enclosure. Blower means are provided, including a squirrel cage blower wheel mounted adjacent the bottom wall of the enclosure to create an unstable vortex air flow within the enclosure. Control means are provided to delay activation of the blower means for a predetermined period after activation of the heating means.

The subject matter which I regard as my invention is particularly pointed out and distinctly claimed in the concluding portion of this specification. The invention itself, however, both as to its organization and method of operation may best be understood by reference to the following description taken in conjunction with the accompanying drawing.

In the drawing,

FIGURE 1 is a perspective view of a free-standing, domestic electric range including one embodiment of the present invention; and FIGURE 2 is a partial schematic diagram of an electrical control circuit for the oven of FIGURE 1, showing the control means for the vortex air flow blower means.

Turning now to consideration of the drawings, and in particular to FIGURE 1, there is shown for illustrative purposes a free-standing electric range 10 having a top cooking surface 11 with a plurality of surface heating units 12, and a cooking cavity 13 formed by a box-like oven liner 14 and a front-opening, drop-door 15. The oven liner 14 has a top wall 16, bottom wall 17, back wall 18 and opposite side walls 19 of the oven cavity or enclosure, while the inner surface 20 of an oven door 15 forms the front wall for the oven enclosure. Of course, this invention is not limited to use in electric ovens. The oven could be heated by gas, and it could be a built-in wall oven or any other type of high temperature heated oven cavity.

The illustrated oven is supplied with two standard heating elements; namely, a lower baking element 21 and an upper broiling element 22 located adjacent the bottom and top walls of the oven liner respectively. The back edge of the cooking surface 11 is supplied with a backsplash 23 which supports a control panel including multiple pushbutton switches 24 for controlling the surface heating elements 12, an oven selector switch 25, an oven thermostat 26 and an oven timer 27 for timing oven cooking operations, all as is conventional in this art.

When it is desired to use the oven for cooking, the food to be cooked is supported on an open-frame oven rack (not shown), which in turn is supported on selected ones of the spaced, horizontal supporting ribs or embossments 28 formed on each of the opposite side walls 19 of the oven enclosure. The pivoted oven door 15 is then closed and the appropriate settings of the oven controls 25, 26 and 27 are made to activate the heating elements 21 and 22 of the oven and control the use thereof. Applicant has found that food preparation processes such as baking can be substantially improved by creating an unstable vortex air flow within the oven cavity or enclosure 13, such as that indicated by the arrows 29.

It will be understood that the term "unstable vortex air flow" means an air flow which is of a spiral or vortex nature and is unstable as to position within the oven enclosure. With such a positionally unstable flow, the vortex will wander in a random pattern within the oven changing its direction of movement when impinging upon one of the various walls of the oven enclosure or the container in which the food is being held. This wandering vortex of air moving at random within the oven enclosure will greatly increase the heat transfer capability of the oven so as to give faster cooking. Moreover, since this random movement of the vortex air flow continues during most of the time that the food is being heated, it will insure that heated air is blown across all of the various surfaces of the food so as to give an even browning effect. An optimum means for obtaining an unstable vortex air flow is by rotatably mounting a squirrel cage type blower wheel 30 adjacent the inner side of one wall of the oven enclosure. It will be understood that squirrel cage type blower wheels are rather inefficient air movers, thus the air flow within the oven is not a high velocity flow which could cause uneven browning; rather, the squirrel cage blower wheel merely serves to impart sufficient energy to the air to maintain the air flow in a vortex pattern. For rotational driving purposes the blower wheel may be connected to a shaft 31 which extends through an appropriate opening (not shown) in the adjacent oven wall and is connected to a suitable electric motor (not shown) located outside the oven enclosure.

The blower wheel 30 is shown mounted adjacent the lower wall 17 of the oven cavity or enclosure 13 as this is the optimum position of the blower wheel. However, it will be understood that the wheel may be mounted adjacent any of the walls. In cooking many items it would be of little difference adjacent which wall the blower was mounted. However, with some items, mounting the blower wheel on one of the horizontally disposed walls is much to be preferred. When using the oven to bake an item such as cookies, the housewife normally employs a flat, metal cookie sheet which fills most of the horizontal cross section of the oven. With a blower wheel mounted adjacent a horizontal wall of the oven liner the cookie sheet will be almost tangential to the pattern of flow of the air within the oven and thus will offer very little resistance to the air flow. However, if the blower wheel were mounted on a vertically disposed wall a cookie sheet would be at substantially right angles to the air flow and could greatly disturb the vortex flow. Additionally, applicant has found that the vortex air flow will perform in a more desirable manner when the wheel is mounted adjacent the bottom rather than the top wall.

If the blades of wheel 30 were completely exposed, food particles and grease could impinge on them, particularly, during broiling operations. In order to protect the wheel, a thin ring member or shield 30a is mounted directly above the blades of the blower wheel by means of a series of radially spaced rod members 50 supported from the oven bottom wall 17. This ring protects the blades without materially interfering with the air flow.

In cooking many items, it is inconsequential whether the vortex air flow is begun immediately upon activation of the oven heating element or elements or is delayed for some pre-determined period of time. However, when cooking pastry type products utilizing leavening ingredients, optimum results are obtained by pre-heating the oven before placing the food therein and delaying activation of the blower for a pre-determined period of time after the cooking process has begun. Such pastry products traditionally have a dome top; that is, their greatest thickness is at their center and they rise very little adjacent the side walls of the pan in which they are cooked. This is because there is very rapid heat transfer between the walls of the pan and the batter just adjacent the walls so that the crust first forms adjacent the walls of the pan. This results in the domed shape pastry products housewives are used to. If the vortex air flow is begun when the heating of the pastry product is begun, the increased heat transfer at all exterior surfaces of the batter quickly forms a crust essentially encapsulating the remainder of the uncooked batter so that the reaction of the leavening agent during the cooking process creates an undersirable contour of the baked item.

Referring now to FIGURE 2 of the drawing, there is shown therein a partial schematic diagram of an electrical control circuit for the oven of FIGURE 1, including means for delaying activation of the blower means for a pre-determined period of time after activation of the heating means for the oven. In normal use the heating elements of an electric oven are energized from a source of electrical energy through a three wire circuit including two line wires L1 and L2 and a neutral wire N with approximately 230 volts appearing across the two line wires and approximately 115 volts between the neutral wire and either one of the line wires.

As shown in the circuit diagram of FIGURE 2, line wire L1 terminates in a double-sided contact 32, while neutral wire N terminates in a single-sided contact 33 and line wire L2 ends in a single-sided contact 34. A lead 35 is provided with a contact 36 which selectively may move into engagement with contact 32. Baking unit 21 is connected at one end to lead 35 through a thermostat contact 37, and at the other end to a lead 38 which terminates in a contact 39, which selectively may be moved into engagement with contact 34 of supply line L2. A double-sided lead 40 connects a contact 41 to one end of broil unit 22 through a thermostat contact 42 while the other end of broil unit 22 is connected to lead 38. Contact 41 selectively may be moved into engagement with contact 32, with contact 33 or to a neutral position in which it is in engagement with neither contact. The contacts 32, 33, 34, 36, 39 and 41 normally are provided as part of the oven selector switch 25, and appropriate circuit arrangements are provided by rotating switch 25 to a predetermined position.

The motor for blower wheel 30 is schematically represented by a coil 30b connected at one end to lead 35 through a thermostatic switch 43 of a single position time delay thermostat 44. The other end of motor coil 30b is connected through an oven door switch 45 to a neutral conductor $N_1$. It will be noted that N and $N_1$ are both the neutral conductors and in actual practice would be connected together, but are shown schematically as two separate conductors for ease of illustration. An integral heater 46 of the thermostat 44 is connected between lead 35 and neutral conductor $N_1$. The thermostat 44 is mounted in the oven so that the thermostatic switch 43, which may be a bimetal, will respond both to its integral heater 46 and to the heat of the cold terminal of bake unit 21. This relationship is shown schematically by illustrating thermostat 44 as a broken line box surrounding switch 43, heating element 46 and the cold terminal 47 of bake unit 21. The oven door switch 45 would be positioned on the front of the oven body, as is seen in FIGURE 1, so as to be moved from its normally open position to its closed position when the door 15 is moved to its closed position.

When it is desired to bake items in the oven, oven selector switch 25 is moved so as to cause contact 36 to engage contact 32, contact 41 to engage contact 33 and contact 39 to engage contact 34. With this arrangement the bake unit 21 is connected across a 230 volt source of electrical energy at full wattage, while the broil unit 22 is connected across a 115 volt source of electrical energy at one-quarter wattage. For baking operations, the oven door switch 45 is closed, and the thermostatic switch 43 initially is open. Thus, the motor coil 30b will not be activated to rotate blower wheel 30 and cause a vortex air flow within the oven cavity or enclosure. Heat from both the integral heater 46 and the cold terminal 47 of bake unit 21 impinge upon the bimetal switch 43 until it is heated sufficiently to close, at which time the motor coil 30b will be activated and blower wheel 30 will thereafter be rotated to provide a vortex air flow. Recipes for bakery products including leavening ingredients generally specify that the product be baked in a pre-heated oven. Modern ovens normally require five to seven minutes to pre-heat, depending on the temperature selected. By designing the time-delay thermostat 44 with about an eleven minute delay, a four to six minute delay will be provided after the bakery products are placed in the oven. This predetermined delay in the activation of the blower wheel insures optimum cooking results even for bakery products including leavening ingredients. It will be understood that any suitable time delay may be built into thermostat 44, depending on the pre-heat time of the oven with which it is to be used, so as to give a suitable time delay after the bakery products are placed in the oven.

It will be noted that the oven thermostat switch contacts 37 and 42 are part of the oven thermostat 26 so as to activate and de-activate the bake unit 21 and broil unit 22 in a cycling manner to maintain a pre-selected temperature within the oven cavity. After the thermostatic switch 43 has closed, the opening and closing of these oven thermostat switch contacts will not affect the operation of the motor coil 30b and thus the blower wheel 30 will continually rotate because heater 46 is energized independently of the oven thermostat 26.

When it is desired to broil items, oven selector switch 25 and oven thermostat 26 are moved to their broil positions in which contact 36 is out of engagement with contact 32, contact 41 is in engagement with contact 32 and contact 39 is in engagement with contact 34. With these settings, the broil unit 22 is connected across a source of electrical energy of about 230 volts, while the bake unit 21 is de-energized. Broiling normally takes place with the oven door slightly ajar, thus the oven door switch 45 will be in its open position and the blower wheel will not be rotated during broiling operation.

It will be understood by those skilled in this art that appropriate contacts associated with oven timer 27 would be inserted in appropriate ones of the power supply line wires L1, L2 so as to provide automatically timed operations. It will also be understood that other, somewhat modified, control circuits could be incorporated either for other electric or gas ovens without departing from the scope of the invention.

The foregoing is a description of an illustrative embodiment of the invention and it is applicant's intention in the appended claims to cover all forms which fall within the scope of the invention.

What I claim as new and desire to secure by Letters Patent of the United States is:

1. An oven for use in food preparation; said oven including a cooking cavity adapted to receive food to be heated; said cavity being formed by a box-like oven liner and a front-opening access door; heating means adapted to heat food that is placed in said cavity; and blower means mounted within the cavity to create an unstable vortex air flow within said cooking cavity; and time delay control means for said blower means, said control means being adapted to delay operation of said blower means for a pre-determined period after activation of said heating means.

2. An oven for use in food preparation; said oven including walls forming a box-like enclosure adapted to receive food to be heated, said walls including a generally horizontally disposed bottom wall; heating means adapted to heat food that is placed in said enclosure; and blower means including a squirrel cage blower wheel rotatably mounted in a slightly raised position above the inner surface of said bottom wall to create an unstable vortex air flow within said enclosure, and control means for said blower motor, said control means including a thermally responsive time delay device that is adapted to delay operation of said blower motor for a predetermined period after activation of said heating means.

3. An oven for use in food preparation; said oven including walls forming a box-like enclosure adapted to receive food to be heated, said walls including a generally horizontal bottom wall; heating means adapted to heat food that is placed in said enclosure; and blower means including a squirrel cage blower wheel rotatably mounted about a vertical axis and slightly above the said bottom wall, and a motor mounted outside said enclosure and drivingly connected to said blower wheel to create an unstable vortex air flow within said enclosure; and time delay control means for said motor, said control means being adapted to delay activation of said motor for a pre-determined period after activation of said oven heating means, and an annular shield supported from said bottom wall to overlie the cage of the blower wheel.

References Cited
UNITED STATES PATENTS

| | | | |
|---|---|---|---|
| 2,308,332 | 1/1943 | Irwin et al. | 34—54 |
| 2,408,331 | 9/1946 | Mills | 219—400 |
| 3,261,650 | 7/1966 | Stromquist | 126—21 |
| 3,313,917 | 4/1967 | Ditzler et al. | 126—21 |

FREDERICK L. MATTESON, JR., *Primary Examiner.*

E. G. FAVORS, *Assistant Examiner.*